| United States Patent [19] | [11] Patent Number: 4,831,098 |
| Watanabe et al. | [45] Date of Patent: May 16, 1989 |

[54] ANTISTATIC AGENT

[75] Inventors: Akio Watanabe; Toshiaki Doyama, both of Kyoto, Japan

[73] Assignee: Dai-ichi Kogyo Seiyaku Co., Ltd., Kyoto, Japan

[21] Appl. No.: 60,350

[22] Filed: Jun. 10, 1987

[30] Foreign Application Priority Data

Jun. 13, 1986 [JP] Japan ................................ 61-138467

[51] Int. Cl.$^4$ ............................................. C08G 18/81
[52] U.S. Cl. ........................................ 528/45; 528/48; 528/55; 528/61; 528/66; 528/71; 524/462; 524/464; 524/589; 524/590; 524/710; 524/745; 524/792; 428/394
[58] Field of Search ............... 524/462, 464, 589, 590, 524/710, 745, 792; 528/45, 61, 55, 48, 66, 71; 428/394

[56] References Cited

U.S. PATENT DOCUMENTS 3,971,764  7/1976  Schürmann et al. ............. 428/425.1
4,500,597  2/1985  Yazaki et al. ..................... 428/317.7

Primary Examiner—John Kight
Assistant Examiner—S. A. Acquah
Attorney, Agent, or Firm—Antonelli, Terry & Wands

[57] ABSTRACT

An antistatic agent containing a cationic and/or amphoteric, water-soluble or water-dispersible and heat-reactive blocked urethane prepolymer as an essential component, said prepolymer having at least one cationic group and/or at least one amphoteric group in its molecule and having isocyanate groups blocked with a thermally dissociable blocking agent. The antistatic agent is applicable to various materials and can give the antistatic property with the water repellency, which can be kept for a long term, to the materials.

5 Claims, No Drawings

ANTISTATIC AGENT

BACKGROUND OF THE INVENTION

The present invention relates to an antistatic agent capable of giving an antistatic property kept for a long term to surfaces of various kinds of materials such as fibers, threads, cotton, papers and films.

Hitherto, there have been provided various antistatic agents such as an agent composed of a cationic surfactant an amphoteric surfactant, or an antistatic agent composed of a urethane polymer or prepolymer containing a large amount of a polyol such as polyethylene glycol or ethylene oxide chain, in order to give an antistatic property to various materials.

However, when the antistatic agent of the cationic or amphoteric surfactant is used, though the antistatic property just after treating is excellent, the property cannot be kept long. On the other hand, when the antistatic agent of the urethane polymer or prepolymer is used, though the antistatic property can be kept long, the antistatic property is poor in comparison with that of the antistatic agent of the cationic or amphoteric surfactant. Further, it is very difficult to give a water repellency with antistatic property kept for a long term to the materials because of a large amount of ethylene oxide. Accordingly, there has not been proposed a treating agent for giving antistatic property with water repellency, which can be kept long, to various materials.

An object of the present invention is to provide an antistatic agent capable of giving antistatic property with water repellency, which can be kept long, to various materials.

The above and other objects of the present invention will become apparent from the description hereinafter.

SUMMARY OF THE INVENTION

In accordance with the present invention, there is provided an antistatic agent comprising a cationic and/or amphoteric, water-soluble or water-dispersible and heat-reactive blocked urethane prepolymer as an essential component, said prepolymer having at least one cationic group and/or at least one amphoteric group in its molecule and having isocyanate groups blocked with a thermally dissociable blocking agent.

The antistatic agent of the present invention can be applied to any material and the application method is very simple. Also, the agent is capable of giving the antistatic property which can be kept for a long term to various materials without lowering the hand touch and the adhesion of the materials.

DETAILED DESCRIPTION

In the present invention, the cationic and/or amphoteric, water-soluble or water-dispersible, and heat-reactive blocked urethane prepolymers are prepared by the following methods (1) to (3).

(1) An organic polyisocyanate (C) is reacted with a compound (A) having at least one tertiary amino group and at least one active hydrogen atom in its molecule and a compound (B) having at least two active hydrogen atoms in any proportions to give a urethane prepolymer (D) containing free isocyanate groups, the urethane prepolymer (D) is cationized with a cationizing agent or is subjected to the formation of amphoteric group with an agent for forming an amphoteric group, and the prepolymer is blocked with a thermally dissociable blocking agent.

(2) The organic polyisocyanate (C) is reacted with the compound (A) having at least one tertiary amino group and at least one active hydrogen atom in its molecule and the compound (B) having at least two active hydrogen atoms in any proportions to give the urethane prepolymer (D) containing free isocyanate groups, the urethane prepolymer (D) is blocked with the thermally dissociable blocking agent, and the blocked urethane prepolymer is cationized with the cationizing agent or is subjected to the formation of amphoteric group with the agent for forming amphoteric group.

(3) The organic polyisocyanate (C) is reacted with a compound (A') having at least one cationic group and/or amphoteric group and at least one active hydrogen atom in its molecule and the compound (B) having at least two hydrogen atoms in any proportions to give a urethane prepolymer (D') containing free isocyanate groups, and the urethane prepolymer is blocked with a thermally dissociable blocking agent. The preparation of the blocked urethane prepolymer is not limited thereto.

The reaction of the organic polyisocyanate (C) with the compound (A) or (A') having at least one tertiary amino group, or cationic group and/or amphoteric group and at least one active hydrogen atom in its molecule and the compound (B) having at least two hydrogne atoms in any proportions can be carried out in two reaction stages. Also, as aforementioned, after obtaining the urethane prepolymer (D), the cationization and/or the formation of amphoteric group might be conducted before or after the blocking reaction.

Examples of the compound (A) having at least one tertiary amino group and at least one active hydrogen atom in its molecule are, for instance, (a) compounds having the formulas:

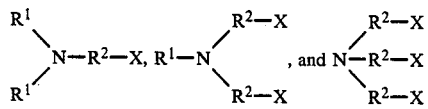

wherein $R^1$ is a substituted or non-substituted monovalent hydrocarbon group having 1 to 4 carbon atoms, e.g. an alkyl group having 1 to 4 carbon atoms such as methyl group, ethyl group, propyl group or butyl group, phenyl group, benzyl group, and the like; $R^2$ is an alkylene group having 2 to 4 carbon atoms, an oxyalkylene group or polyoxyalkylene group; and X is hydroxy group, amino group or mercapto group; (b) imidazoles such as imidazole, 2-methylimidazole, 2-ethylimidazole or 2,4(2,5)-dimethylimidazole, imidazoline or imidazolidones; (c) addition products of an amine having at least one active hydrogen atom with an alkylene oxide such as ethylene oxide, propylene oxide or butylene oxide; and the like. Examples of the above-mentioned amines are, for instance, alkanolamines such as ethanolamine, triethanolamine or triisopropanolamine, N-methylamine, ammonium, ethylenediamine, polyalkylene polyamines such as diethylenetriamine or triethylenetetramine, diaminodiphenylmethane, phenylenediamine, xylylenediamine, piperazine, and the like.

The compound (A') having at least one cationic group and/or amphoteric group and at least one active hydrogen atom are compouds which are cationized with a cationizing agent, or are subjected to the formation of amphoteric group with an agent for forming amphoteric group.

Examples of the compound (B) having at least two active hydrogen atoms are, for instance, polyether polyols, polyester polyols, polyester polyether polyols, and the like.

As the polyether polyol, there are exemplified, for instance, an addition product of a compound having at least two active hydrogen atoms with an alkylene oxide. Examples of the compound having at least two active hydrogen atoms are, for instance, polyhydric alcohols, amines, and the like. Examples of the polyhydric alcohols are, for instance, diols such as ethylene glycol, propylene glycol, butanediol, hexanediol, octanediol or decanediol, triols such as glycerol, hexanetriol, trimethylolethane or trimethylolpropane, polyols such as erythritol, pentaerythritol, sorbitol or saccahrose, and the like. Examples of the amines are, for instance, alkanol amines such as ethanolamine, triethanolamine, triisopropanolamine or tributanolamine, N-methylamine, ammonium, ethylenediamine, polyalkylene polyamines such as diethylenetriamine or triethylenetetramine, diaminodiphenylmethane, phenylenediamine, xylenediamine, piperazine, and the like. Examples of the polyester polyol are, for instance, a condensate of a dibasic fatty acid or an anhydride thereof with the above-mentioned polyhydric alcohols, polyether polyol or the like, and the like.

Examples of the cationizing agent used in the present invention are, for instance, an inorganic acid such as sulfuric acid, hydrochloric acid or phosphoric acid, an organic acid such as acetic acid, methyl iodide, methyl chloride, dimethyl sulfate, diethyl sulfate, ethyl bromide, benzyl chloride, ethylene chlorohydrin, epichlorohydrin, and the like. Examples of the agent for forming amphoteric group used in the present invention are, for instance, monochloroacetatic acid, sodium monochloroacetate, and the like. These agents are added at a temperature of 20° to 100° C. for 10 minutes to 5 hours. Also, an amount thereof is more than 0.5 mole, preferably 0.8 mole per mole of the compound (A) or (A') having tertiary amino group.

Examples of the organic polyisocyanate (C) are, for instance, tolyene diisocyanate (T-DI), a polyphenyl polymethyl polyisocyanate such as diphenylmethane diisocyanate (M-DI) a liquid M-DI, crude M-DI, hexamethylene diisocyanate (HM-DI), xylylene diisocyanate ((X-DI), isophorone diisocyanate (IP-DI), and the like. In order to prevent yellowing of the product, it is preferable that the aliphatic isocyanate such as HM-DI, the alicyclic isocyanate such as IP-DI, and the aromatic-aliphatic isocyanate such as X-DI are used.

The organic polyisocyanate (C) is reacted with the compound (A) or (A') having at least one tertiary and/or quaternary amino group and at least one active hydrogen atom and the compound (B) having at least two active hydrogen atoms in any proportions to give the urethane prepolymer (D) containing 0.5 to 10.0% by weight of free isocyanate groups in a usual manner at a temperature of 30° to 130° C., for 30 minutes to 50 hours. In the above reaction, a molar ratio of the group NCO to active hydrogen atom is not less than 1.0.

The urethane prepolymer can be prepared in nonsolvent system. However, according to the viscosity of the urethane prepolymer, a solvent inactive with the isocyanate and capable of dissolving the urethane prepolymer may be used. Examples of the solvents are, for instance, dioxane, methyl ethyl ketone, dimethylformamide, tetrahydrofuran, N-methylpyrrolidone, toluene, and the like.

Next, the method for blocking the urethane prepolymer containing free isocyanate groups is explained as follows:

The blocking agent used in the present invention is one capable of reacting with the urethane prepolymer at room temperature to 100° C. and capable of blocking free isocyanate group of the urethane prepolymer. Examples of the blocking agents are, for instance, secondary and tertiary alcohols, active methylene compounds, phenols, oximes, lactams, imidazoles, and the like. The urethane prepolymer can be reacted with blocking agents in a known manner, e.g., in the presence of a catalyst for converting into urethane or an catalyst of an alcoholate of alkali metal, or in the absence of the catalyst.

Thus obtained urethane prepolymer has cationic group and/or amphoteric group and is stably water-soluble or water-dispersible and heat-reactive. The urethane prepolymer is subjected to heat-treatment at 100° to 180° C. to dissociate the blocking agent, thus resulting in regeneration of free isocyanate groups. The regenerated isocyanate is reacted to convert the prepolymer into a high molecular weight compound.

Accordingly, the urethane prepolymer used in the present invention has excellent durability, tensile strength and non-adhesion in comparison with the known aqueous urethanes.

The antistatic agent of the invention contains the water-soluble or water-dispersible and cationic and/or amphoteric urethane prepolymer prepared by the above manner as an essential component. That is, the blocked urethane prepolymer used in the invention is in the form of an aqueous composition, namely an aqueous solution or aqueous emulsion in water alone or a mixed solvent of water and a water-miscible organic solvent such as a lower alcohol. Various materials are treated with the antistatic agent of the present invention in a bath, and then, the treated material is treated with heat, whereby the prepolymer is polymerized on the surface of the materials. The thus obtained material is given the antistatic property which can be kept for a long term. Usual manners such as dipping, spraying and coating can be applied as a manner for applying the antistatic agent to various kinds of materials. The antistatic agent is applied to the materials in an amount of at least 0.05% by weight based on the material. However, this range may depends on the purpose of materials to be processed.

The antistatic agent of the present invention can also contain other resins such as urea-formaldehyde resins, melamine resin, glyoxal resins, epoxy resins, phenol resins, silicone resins, fluororesin, vinyl resins or polyurethane resins so long as the antistatic property is not inhibited.

The antistatic agent of the present invention has the same antistatic property as that in the known cationic or ampholytic surfactant, it has hitherto been known that the cationic or amphoteric surfactant excellent antistatic property. The occurance of frictional electrification is prevented by electron-transfer between the cationic groups or the amphoteric groups existing on the surface of the treated materials, which is different from the case of the polyethylene glycol or nonionic surfactant containing a large amount of ethylene oxide or urethane resin composition containing the same as a main component. That is, the antistatic mechanism in the antistatic agent of the invention is quite different from that in the nonionic surfactant or urethane resin composition that ions are transfered in water thereby causing lack of electric charge. Therefore, the antistatic agent of the present invention can give the water repellency with the antistatic property, which is very difficult in the conventional manner. In such a case, by using the fluororesin or silicone resins, the water repellency can be given to the material with the antistatic property, the properties are kept for a long term.

In the present invention, various materials such as fibers, cloths, cottons, papers and films are applied.

Examples of the fibers are, for instance, synthetic fibers such as polyester, polyamide, polyacrylonitrile, vinylon, polypropylene, polyethylene or spandex, natural fibers such as cotton, flax or hemp, silk, or wool, regenerated fibers such as rayon or acetate, inorganic fibers such as glass fiber, carbon fiber or silicone carbide fiber, and the like. The fibers can be applied in the form of knitted goods, woven goods, nonwoven fablic, and the like. Of course, the agent is applicable to clothes such as blended yarn fabrics, combined filament yarn fabrics, union cloth of these fibers. It is also possible that after treating the yarns, staples, filaments or tows with the agent, the treated materials are knitted, woven or made non-woven clothes. Examples of the papers are, for instance, natural paper, regenerated paper, and the like. Examples of the films are, for instance, polyester films, polypropylene films, polyethylene films, and the like.

The present invention is more specifically described invention is more specifically described and explained by means of the following examples in which all parts and % are by weight unless otherwise noted. It is to be understood that the present invention is not limited to the examples, and various changes and departing from the spirit and scope thereof.

REFERENCE EXAMPLE 1

There was added 16.8 parts of 1,6-hexamethylene diisocyanate to 100 parts of a glycerol-based ethylene oxide-propylene oxide [ethylene oxide (EO): propylene oxide (PO)=30:70] polyaddition product having a molecular weight of 3,000, and the mixture was reacted at 90° C. for 60 minutes to give a urethane prepolymer having a free isocyanate group content of 3.60%. Then, 2.97 parts of 2-dimethylaminoethanol was added thereto and the mixture was reacted at 80° C. for 60 minutes to give a tertiary amino group-containing urethane prepolymer having a free isocyanate group content of 2.20%. To the reaction mixture was added 5.14 parts of diethyl sulfate at 70° C. and the reaction was conducted at 70° C. for 90 minutes, to which a solution of 4.30 parts of imidazole in 20 parts of methyl ethyl ketone was added, and reacted at 60° C. for 2 hours. After confirming 0% of the isocyanate group content in the urethane prepolymer, 501 parts of water was added to the resulting mixture to give a transparent aqueous solution of a cationic blocked isocyanate having a resin content of 20%.

REFERENCE EXAMPLE 2

There was added 10.1 parts of diethyl sulfate to 100 parts of an ethylenediamine-based ethylene oxideo-propylene oxide [EO:PO=15:85] polyaddition product having a molecular weight of 1,500, and the mixture was reacted at 80° C. for 2 hours. Then, 5.2 parts of 1,6-hexamethylene diisocyanate was added thereto and the mixture was reacted at 95° C. for 90 minutes to give a cationic group-containing urethane prepolymer having a free isocyanate group content of 7.2%. To the reaction mixture was added a solution of 58.0 parts of nonyl phenol in 84 parts of methyl ethyl ketone and reacted at 80° C. for 2 hours. After confirming 0% of the free isocyanate group content in the urethane prepolymer, 544.5 parts of water was added to the resulting mixture to give a transparent and viscous aqueous solution of a cationic blocked isocyanate having a resin content of 25%

REFERENCE EXAMPLE 3

There was added a solution of 4.6 parts of methyl ethyl ketone oxime in 25.0 parts of dioxane to 100.0 parts of the tertiary amino group-containing urethane prepolymer having the free isocyanate group content of 2.20% prepared in Reference Example 1, and the mixture was reacted at 60° C. for 2 hours. After confirming 0% of the free isocyanate group content in the urethane prepolymer, 3.1 parts of sodium monochloroacetate were added and the mixture was reacted at 80° C. for 3 hours. Then, 226.2 parts of water were added thereto to give a transparent aqueous solution of a amphoteric blocked isocyanate having a resin content of 30%.

REFERENCE EXAMPLE 4

There were added 7.7 parts of 1,6-hexamethylene diisocyanate to 50.0 parts of a glycerol-based ethylene oxide-propylene oxide [EP:PO=70:30] polyaddition product having a molecular weight of 3,300, and 15.1 parts of polyethylene glycol having a molecular weight of 2,000, and the mixture was reacted at 100° C. for 2 hours to give an urethane prepolymer having a free isocyanate content of 2.0%. Then, 12.0 parts of an aqueous solution of 30% of sodium bisulfite were added and the reaction was conducted at 45° C. for 70 minutes with stirring, and the reaction mixture was diluted with 157.9 parts of water to give a transparent and viscous aqueous solution of an anionic blocked isocyanate, having a resin content of 30%.

EXAMPLES 1 TO 3 AND COMPARATIVE EXAMPLES 1 AND 2

There was added 0.5 part of an organotin compound catalyst (commercially available under the trademark "Elastoron Catalyst 32" made by Dai-Ichi Kogyo Seiyaku Co., Ltd.) to 14 parts of the thermally reactive urethane prepolymer composition obtained in Reference Example 1, 2, 3 or 4 to give an antistatic agent. A nylon taffeta was dipped in the antistatic agent and was squeezed (pick up: 40%). After the nylon taffeta was dried with hot air at 120° C. for 3 minutes and was heat-treated at 160° C. for 2 minutes. The frictional electrification of the treated nylon taffeta was measured. The results are shown in Table 1 with the results for the nontreated nylon taffeta (Comparative Example 2).

The frictional electrification was measured at 20° C. under a humidity of 40% by using a Kyodai Kakenshiki rotaric static tester at 3 minutes after beginning of rubbing and at 3 minutes after stopping of the rubbing. The treated nylon taffeta was rubbed with a nylone dechine. As test samples, the unwashed treated nylon taffeta, the treated nylon taffeta washed 10 times by a home washing machine (HL10), and the treated nylon taffeta washed 30 times in the home washing machine (HL30). The washing was conducted according to JIS (Japanese Industrial Standards) L 0217 103. The procedure of one washing was that the nylon taffeta was washed in a bath ratio of 1:30 using 1 g of a synthetic detergent at 40° C. for 5 minutes and then washed with hot water at 40° C. for 10 minutes, followed by air-drying.

TABLE 1

| Ex. No. | Urethane prepolymer composition | Frictional electrification (V) | | | | | |
|---|---|---|---|---|---|---|---|
| | | Three minutes after beginning of rubbing | | | Three minutes after stopping of rubbing | | |
| | | Unwashed | HL 10 | HL 30 | Unwashed | HL 10 | HL 30 |
| Ex. 1 | Composition of Ref. Ex. 1 | 500 | 800 | 1300 | 110 | 110 | 140 |
| Ex. 2 | Composition of Ref. Ex. 2 | 400 | 600 | 1000 | 120 | 140 | 180 |
| Ex. 3 | Composition of Ref. Ex. 3 | 600 | 800 | 900 | 120 | 150 | 170 |
| Com. Ex. 1 | Composition of Ref. Ex. 4 | 2100 | 6400 | 9100 | 1700 | 5700 | 5400 |
| Com. Ex. 2 | None | 8000 | ∞ | ∞ | 1400 | ∞ | ∞ |

EXAMPLES 4 TO 6 AND COMPARATIVE EXAMPLES 3 AND 4

There were added 0.5 part of Elastoron Catalyst 32 and 5 parts of a repellent of a fluorine-containing compound to 15 parts of the thermally reactive urethane prepolymer composition obtained in Reference Example 1, 2, 3 or 4 to give an antistatic agent. A polyester palace was squeezed (pick up: 70%), and was heat-treated in the same manner as in Example 1. With the treated polyester palace, the frictional electrification was measured in the same manner as in Example 1 and the water repellency was measured according to JIS L 1005. The results are shown in Table 2 with the result for the nontreated polyester palace (Comparative Example 4).

TABLE 2

| Ex. No. | Urethane prepolymer composition | Frictional electrification (V) | | | | | | Water repellency (point)*1 | | |
|---|---|---|---|---|---|---|---|---|---|---|
| | | Three minutes after beginning of rubbing | | | Three minutes after stopping of rubbing | | | | | |
| | | Unwashed | HL 10 | HL 30 | Unwashed | HL 10 | HL 30 | Unwashed | HL 10 | HL 30 |
| Ex. 4 | Composition of Ref. Ex. 1 | 150 | 400 | 480 | 90 | 170 | 220 | 100 | 90 | 80 |
| Ex. 5 | Composition of Ref. Ex. 2 | 160 | 180 | 240 | 80 | 90 | 140 | 100 | 90 | 80 |
| Ex. 6 | Composition of Ref. Ex. 3 | 160 | 200 | 520 | 80 | 140 | 200 | 100 | 80 | 70 |
| Com. Ex. 3 | Composition of Ref. Ex. 4 | 680 | 1100 | 1800 | 120 | 660 | 900 | 90 | 50 | 0 |
| Com. Ex. 4 | None | 2400 | 2800 | 5400 | 1800 | 1800 | 2300 | 0 | 0 | 0 |

(Note)
*1According to JIS L 1005

EXAMPLES 7 TO 9 AND COMPARATIVE EXAMPLES 5 AND 6

There was added 0.5 part of Elastoron Catalyst 32 to 15 parts of the thermally reactive urethane prepolymer composition obtained in Reference Example 1, 2, 3 or 4 to give an antistatic agent. The obtained agent was applied to a polyester film having a thickness of 200 μm with an absorbent cotton and dried at a room temperature for 25 hours, and heat-treated at 100° C. for 30 minutes. The surface resistivity of the treated film was measured at 20° C. under a humidity of 40% by using an SH-10F tester made by Toa Denpa Kogyo Kabushiki Kaisha. The results are shown in Table 3 with the results for the nontreated film (Comparative Example 6).

TABLE 3

| Ex. No. | Urethane prepolymer composition | Surface resistivity (Ω) |
|---|---|---|
| Ex. 7 | Composition of Ref. Ex. 1 | $5.3 \times 10^7$ |
| Ex. 8 | Composition of Ref. Ex. 2 | $1.3 \times 10^8$ |
| Ex. 9 | Composition of Ref. Ex. 3 | $1.4 \times 10^8$ |
| Com. Ex. 5 | Composition of Ref. Ex. 1 | $6.8 \times 10^8$ |
| Com. Ex. 6 | None | More than $1 \times 10^{14}$ |

What we claim is:

1. An antistatic agent comprising a cationic and/or amphoteric, water-soluble or water-dispersible and heat-reactive blocked urethane prepolymer as an essential component, said prepolymer having at least one cationic group and/or at least one amphoteric group in its molecule and having isocyanate groups blocked with a thermally dissociable blocking agent.

2. An antistatic agent comprising a cationic and/or amphoteric, water-soluble or water-dispersible and heat-reactive blocked urethane prepolymer as an essential component, said prepolymer having at least one cationic group and/or at least one amphoteric group in its molecule and having isocyanate groups blocked with a thermally dissociable blocking agent; said blocked urethane prepolymer being a urethane prepolymer prepared by reacting a compound having at least one tertiary amino group and at least one active hydrogen atom in its molecule and a compound having at least two active hydrogen atoms with an organic polyisocyanate in any proportion, subjecting the obtained urethane prepolymer containing free isocyanate groups to cationization with a cationizing agent or to formation of amphoteric group with an agent for forming an amphoteric group, and blocking the free isocyanate groups with a thermally dissociable blocking agent.

3. The agent of claim 1, wherein said blocked urethane prepolymer is a urethane prepolymer prepared by reacting a compound having at least one tertiary amino group and at least one active hydrogen atom in its molecule and a compound having at least two active hydrogen atoms with an organic polyisocyanate in any proportion, blocking free isocyanate groups of the obtained urethane prepolymer with a thermally dissociable blocking agent, and subjecting the blocked prepolymer to the cationization with a cationizing agent or to the formation of amphoteric group with an agent for forming an amphoteric group.

4. The agent of claim 1, wherein said blocked urethane prepolymer is a urethane prepolymer prepared by reacting a compound having at least one cationic group and/or amphoteric group and having at least one active hydrogen atom in its molecule and a compound having at least two active hydrogen atoms with an organic polyisocyanate in any proportion, and blocking free isocyanate groups of the obtained urethane prepolymer containing with a thermally dissociable blocking agent.

5. The agent of claim 1, wherein said blocking agent is a member selected from the group consisting of a secondary alcohol, a tertiary alcohol, an active methylene compound, a phenol, an oxime, a lactam, and an imidazole.

* * * * *